United States Patent [19]

Yu

[11] Patent Number: 5,081,627
[45] Date of Patent: Jan. 14, 1992

[54] STATUS AND ACTIVITY MONITOR FOR CONTENTION TYPE LOCAL AREA NETWORKS

[75] Inventor: Hong Yu, Nashua, N.H.

[73] Assignee: Casat Technologies, Inc., Amherst, N.H.

[21] Appl. No.: 375,899

[22] Filed: Jul. 5, 1989

[51] Int. Cl.[5] .............................................. G06F 11/00
[52] U.S. Cl. .................................. 371/29.1; 371/20.1; 340/825.17; 340/815.03; 340/815.17; 439/63
[58] Field of Search ............................. 371/29.1, 20.1; 340/825.17, 825.06, 815.03, 815.17, 815.32; 324/158 F; 439/55, 63, 65; 370/13

[56] References Cited

U.S. PATENT DOCUMENTS

| 3,707,714 | 12/1972 | Plumley | 371/29.1 X |
| 4,498,716 | 2/1985 | Ward | 371/24 X |
| 4,814,754 | 3/1989 | Kawasaki | 371/29.1 X |
| 4,829,244 | 5/1989 | Tom | 324/158 F |
| 4,890,102 | 12/1989 | Oliver | 340/825.17 |

Primary Examiner—Robert W. Beausoliel
Attorney, Agent, or Firm—Davis, Bujold & Streck

[57] ABSTRACT

Diagnostic monitoring apparatus for connection in-line with a cable connecting a first device to a second device and carrying binary information between the first device and the second device over a wire contained in the cable. There is a series connector inserting a connecting wire in series with the wire in the cable. Signal sampling and triggering logic is connected to the connecting wire for sensing any binary signals on the connecting wire and for producing a trigger output when a binary signal is sensed. There is also an illuminatable visible indicator in the form of an LED and a monostable device having the trigger output connected to an input thereof and an output connected to the indicator for producing a signal at the output of sufficient duration to illuminate the indicator for a visibly detectable period of time. The high speed signal sampling and triggering logic is high impedance and connected in parallel to the connecting wire whereby the signal in the wire in the cable is not loaded down. Typically, the cable being monitored is a multi-wire cable and power is derived from one of the wires in the cable. In a contention LAN, the device monitors and displays activity associated with transmit, receive, and collision functions.

5 Claims, 2 Drawing Sheets

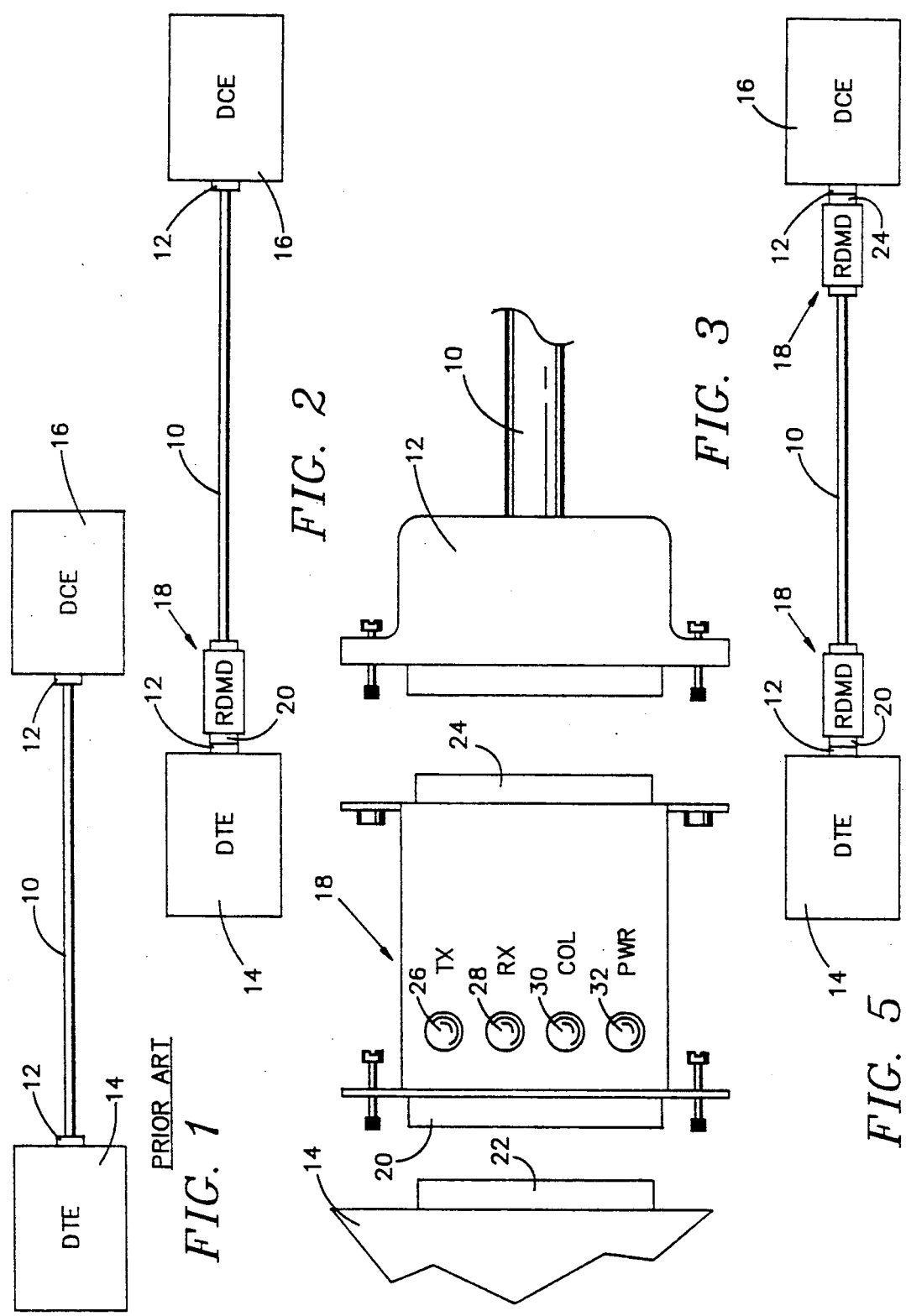

STATUS AND ACTIVITY MONITOR FOR CONTENTION TYPE LOCAL AREA NETWORKS

BACKGROUND OF THE INVENTION

This invention relates to the monitoring of local area networks and, more particularly, in a cable connecting system connecting a first device to a second device with a cable carrying binary information between the first device and the second device over a wire contained in the cable, to the improvement for monitoring activity on the wire comprising, series connection means for inserting a connecting wire in series with the wire in the cable; signal sampling and triggering means connected to the connecting wire for sensing any binary signals on the connecting wire and for producing a trigger output when a binary signal is sensed; an illuminatable visible indicator; and, monostable device means having the trigger output connected to an input thereof and an output connected to the indicator for producing a signal at the output of sufficient duration to illuminate the indicator for a visibly detectable period of time.

The use of local area networks (LANs) to interconnect a number of computing entities has become common place in even small installations. Small businesses, law firms, and the like, routinely interconnect personal computers (PCs) throughout the office and use them to pass information back and forth and to share common printers, modems, etc. over the LAN.

In large, multi-processor installations such as constructed by governmental agencies and large corporations, integral diagnostic routines are commonly employed as the computers typically operate in co-operation with one another to perform a common task or mission on a resources allocation or distributed processing basis. In such an environment, the condition of the LAN and its ability to reliably transmit messages between the computers of the system is of critical importance. If the LAN is totally inoperative (a rare case), this must be sensed as quickly as possible so the maintenance personnel can find and repair the problem. The more usual "failure" condition is a problem at one or more of the interfaces of the computers with the LAN (requiring rerouting of the messages) or excessive traffic on the LAN in whole or in part which causes increased overhead due to the retransmitting of lost or destroyed messages.

While some of these aspects are applicable to a LAN of the token passing variety, they are most prevalent in a contention type of LAN environment. For small business installations, and the like, in particular, a contention LAN is the easiest and least costly to install. The most common is that sold under the name Ethernet which is the trademark for the Carrier Sensing Multiple Access/Collision Detection local area networking protocol developed by Digital Equipment Corporation (DEC), Xerox, and Hewlett-Packard, and IEEE 802.3 Standard (available to the public) applications market. While the status of the LAN as far as traffic, etc. is of interest to the smaller user as well as the larger user who can afford to pay the high cost of an integrated LAN monitoring, diagnostic, and correction system, there is nothing in the prior art which will visually advise the small user about the status of his LAN on a simple and low-cost basis.

Wherefore, it is an object of this invention to provide a very small device which can be inserted in series with the connection of a computer to a LAN which will visually advise the user about the status of his LAN on a simple and low-cost basis.

It is another object of this invention to provide a device which can be inserted in series with the connection of a computer to a LAN at opposite ends of a LAN cable which will visually advise the small user about the health of the cable on a simple and low-cost basis.

Other objects and benefits of the invention will become apparent from the detailed description which follows hereinafter when taken in conjunction with the drawing figures which accompany it.

SUMMARY

The foregoing object has been achieved by the diagnostic monitoring apparatus of the present invention for connection in-line with a cable connecting a first device to a second device and carrying binary information between the first device and the second device over a wire contained in the cable, comprising, series connection means for inserting a connecting wire in series with the wire in the cable; signal sampling and triggering means connected to the connecting wire for sensing any binary signals on the connecting wire and for producing a trigger output when a binary signal is sensed; an illuminatable visible indicator; and, monostable device means having the trigger output connected to an input thereof and an output connected to the indicator for producing a signal at the output of sufficient duration to illuminate the indicator for a visibly detectable period of time.

In the preferred embodiment, the signal sampling and triggering means is a high impedance means connected in parallel to the connecting wire whereby the signal in the wire in the cable is not loaded down.

Also in the preferred embodiment, the cable includes a plurality of wires including one providing power from the first device to the second device and the series connection means includes means for inserting a connecting wire in series with each of the wires in the cable. Additionally, there are power sampling means connected to the one of the connecting wires carrying power from the first device to the second device for providing power from the one of the connecting wires to the signal sampling and triggering means, the indicator, and the monostable device means.

Further in the preferred embodiment, the cable is a cable in a contention type local area network and contains wires associated with transmit, receive, and collision activity data transmission; and, additionally there are a plurality of the illuminatable visible indicators each comprising an LED and associated, respectively, with the transmit, receive, and collision functions; a plurality of the signal sampling and triggering means connected to respective ones of the connecting wire for sensing any binary signals on its associated connecting wire and for producing a trigger output when a binary signal is sensed; and, a plurality of the monostable device means having respective ones of the trigger outputs connected to inputs thereof and each having an output connected to a respective one of the LEDs for producing a signal at the output of sufficient duration to illuminate the LED for a visibly detectable period of time when a signal is detected on its associated connecting wire.

DESCRIPTION OF THE DRAWINGS

FIG. 1 is a simplified drawing depicting the prior art connection between data terminal equipment (DTE) on one end and data communications equipment (DCE) on the other end.

FIG. 2 is a simplified drawing depicting a connection between the DTE and DCE as in FIG. 1 with the remote diagnostic monitor device (RDMD) of this invention inserted in line with the connection.

FIG. 3 is a drawing of the preferred RDMD of this invention showing the manner of simplified connection thereof into a cable connection.

FIG. 5 is a simplified drawing depicting a connection between the DTE and DCE as in FIG. 1 with the remote diagnostic monitor device (RDMD) of this invention inserted in line with the connection at opposite ends of the connecting cable to allow the health of the cable to be diagnosed.

DESCRIPTION OF THE PREFERRED EMBODIMENT

Figure 4:
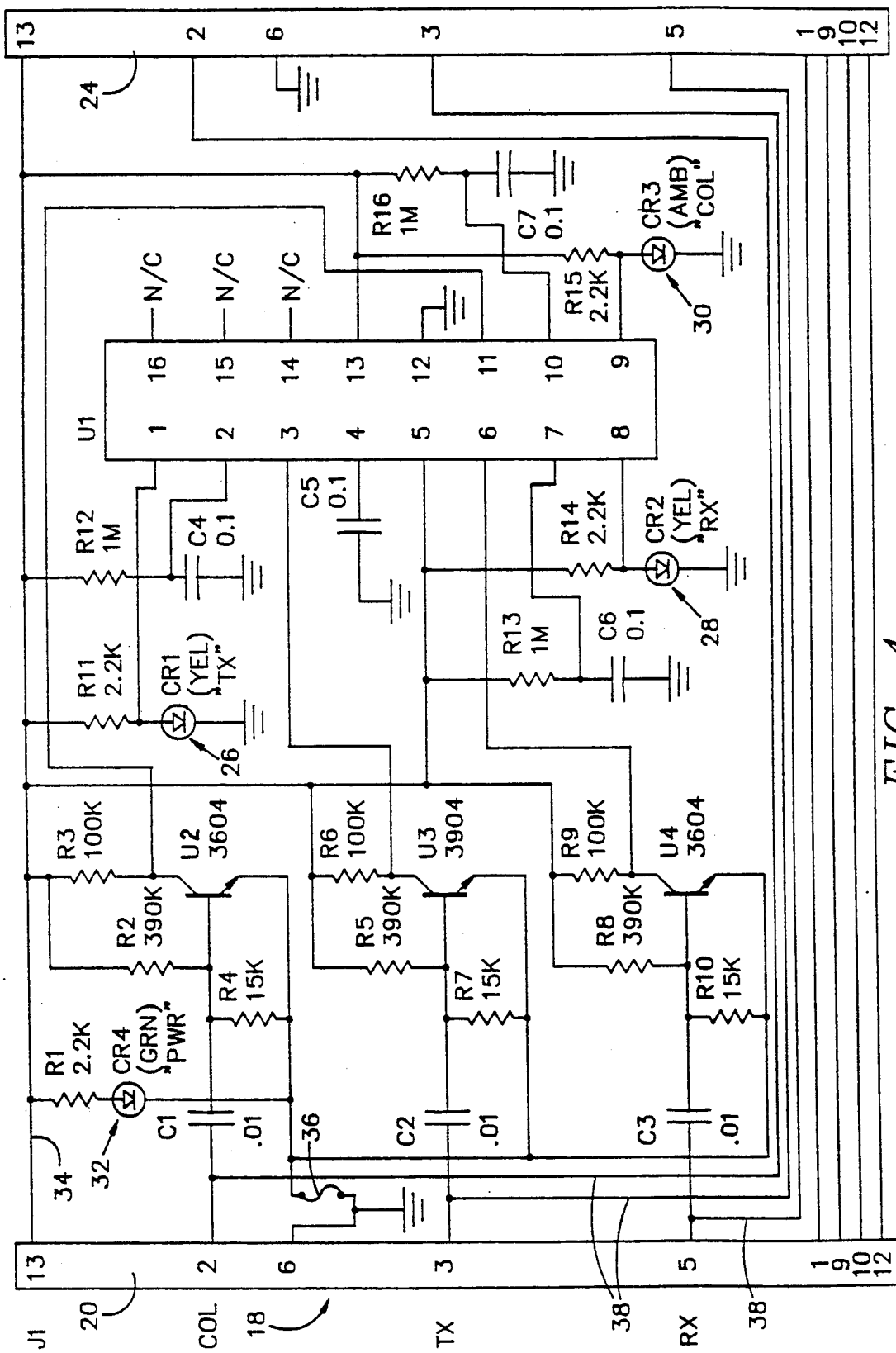
FIG. 4 is a simplified schematic of the RDMD of this invention in its preferred embodiment.

In IEEE 802.3 and Ethernet applications as depicted in simplified form in FIG. 1, an individually shielded pair of cables 10 having 15-pin connectors 12 on the ends is used to interconnect between the data terminal equipment (DTE) 14 on one end and the data communications equipment (DCE) 16 on the other end. The remote diagnostic monitor device (RDMD) of this invention, generally indicated as 18 hereinafter, is generally installed between any two pieces of data communications equipment interconnected by a cable or cable. Its installation in the equipment of FIG. 1 is shown in simplified form in FIG. 2. A preferred form of the RDMD 18 is shown in FIG. 3. In the preferred form of FIG. 3 and as depicted in FIG. 2, the input plug 20 of the RDMD 18 is plugged directly into the output port 22 of the DTE 14 and then one of the connectors 12 of the cable 10 is plugged into the output port 24 of the RDMD 18. Thus, the preferred configuration of the RDMD 18 very similar to so-called "gender changers", and the like, which are well known in the art as being simple to use and install. One simply has to unplug the connecting cable 10 and insert the RDMD 18 in series with the connection at the output port 22. As will be discussed in greater detail shortly, the RDMD 18 has four LEDs 26, 28, 30 and 32 mounted thereon and visible to the user designated as TX, RX, COL, and PWR, respectively.

Since the RDMD 18 is connected in-line with the cable 10, it can, and does, provide its monitoring functions regarding the state of activities on the lines of interest in the cable 10. In its preferred embodiment, the required power for the RDMD 18 is derived from the DTE 14, which generally is supplying the power to the DCE 16 over one of the wires in the cable 10. Therefore, the ability of the RDMD 18 to consume a minimum amount of power was a primary design requirement. The presence of power from the DTE 14 is shown by illumination of the PWR LED 32, which (as will be seen from the circuit diagram of FIG. 4) is connected in series with a 2.2K Ohm resistor (labelled R1), which limits the current driving through the LED 32. As can be seen, the power enters the RDMD 18 through pin 13 of the input plug 20 (labelled J1) and appears on the wire 34 connected thereto which, of course, is in series with the same corresponding wire in the cable 10. Pin 6 of the input plug 20 and output port 24 are connected to ground and the internal circuitry of the RDMD 18 is connected to pin 6 (and ground) through a fuse 36 to prevent damage to the other equipment on the cable 10 in the event of a short or overload in the RDMD 18.

The other three lines of interest within the cable 10 are associated with the collision (COL), transmission (TX), and receive (RX) activities. The wires carrying those signals within the cable 10 are connected to pins 2, 3, and 5, respectively. As will be noted, each of the pins 2, 3, and 5 on the input plug 20 and the output port 24 are interconnected with a connecting wire 38 which places the RDMD 18 in series with the wires of the cable 10. The internal connections are then tapped off of the connecting wires 38 to place the circuits of the RDMD 18 in parallel with the wires of interest within the cable 10 as will be readily recognized by those skilled in the art.

In each case, a NPN transistor with pre-bias (i.e. U2, U3, and U4) is used to do the signal detection. The objective was to minimize component count; and yet, provide a reliable high-speed signal detection capability. Instead of detecting both the signals on the balanced signal line in each case, only one side of the line is detected. Therefore, a very high impedance scheme is necessary to do the signal detection without interfering with and altering the line impedance. To this end, for example, one transistor U2 is pre-biased through the R2 and R4 resistors and configured to act as an activity detection switch. This is a very important aspect of the "thinking process" implemented by the RDMD 18. Since it is the activity of each line with which we are interested and not the actual data content thereof, what the logic of the RDMD 18 looks for is the transient of energy that exists when the line moves from a normally "low" state (indicating a lack of activity on the line) to an active "high" state or the presence of activity (i.e. moving data) on the line. Thus, a minimal expected signal voltage present on the line will add to the voltage biasing the transistor and will trigger the transistor switch from high to low at the collector and, hence, provide an indication of transition of activity to the monostable device U1. In the preferred embodiment as built and soon to be sold commercially, the monostable device U1 was selected as a 558 quad-timer. Since space was of primary concern in the design of the RDMD 18, a 558-quad-timer provided an efficient method of including four independent timer devices on one 16-pin chip. Of course, since the RDMD 18 is only providing an active indication of activity on three lines (TX, RX and COL), only three of the four timers are actually used in this particular application. The other remains available should a particular user desire to monitor activity on a fourth line.

The monostable device U1 is necessary in order to extend the time of illumination of the LEDs 26, 28, and 30. If the LEDs 26, 28, and 30 were illuminated directly by the transitions (i.e. the binary bits) detected on the wires of the cable 10, the illumination of the LEDs 26, 28, and 30 would not be of a time sufficient for the human eye to detect it. Thus, the monostable device U1 is employed to keep any of the LEDs 26, 28, and 30 illuminated for a sufficient time to be seen as a "blink", even if the result of single binary bit being detected on its associated line. The rate of blinking in a continuously busy state is chosen such that the persistence of human vision will see the LED as being continuously illuminated. Thus, as described above, as the transition or the presence of activity is detected and input to the 558 timer (i.e. U1), it acts as the triggering pulse to activate the mono-stable vibrator thereof, which has a stretched time constant derived by the 1M Ohm resistor and the 0.1 micro-farad capacitor (for example, R12 and C4). This stretched pulse is then output from the timer to drive the associated one of the LEDs 26, 28, and 30 through its open collector output. This, in turn, allows the LED to turn on with the current limiting provided by its associated 2.2K Ohm resistor (as with the previously described power LED 32). Since the 558 timer has the higher current driving capability, it can drive the LED as described with minimum parts count.

As those skilled in the art will readily recognize and appreciate, the above-described approach to activity detection and display on a binary data carrying line can be applied across a wide area of applications regarding the feasibility of low-cost, high-speed data line detection. Of course, the selection of parts is a matter of choice from many functionally equivalent alternatives well known to those skilled in the art. For example, the 558 quad-timer could be replaced by four individual/single 555 timers, two 556 dual-timers, or any combination thereof. The individual components are well known to those skilled in the art and readily available commercially. For that reason, they form no part of the novelty of this invention per se and, accordingly, have not been described in any detail herein in the interest of simplicity and the avoidance of redundancy. For the same reason, the redundant details of the circuit of FIG. 4 have not been individually addressed.

Another aspect of this invention is depicted in FIG. 5. As installed in FIG. 2, the RDMD 18 indicates the activity being applied to the wires of the cable 10 by the DTE 14. Of course, if one were to place the RDMD 18 at the other end of the cable 10 at the input to the DTE 14, it would indicate the activity coming from the cable 10. By using a RDMD 18 at each end of the cable 10 as depicted in FIG. 5, however, the health of the cable can be detected by comparing what is going in with what is coming out.

Thus, it can be seen from the foregoing description that the present invention has met its stated objective by providing a low cost device which can be employed to give an indication of the overall activity and type of activity on a LAN of the Ethernet type and which can also be employed in a diagnostic capacity in pairs to determine the health of a section of LAN cable.

Wherefore, having thus described the present invention, what is claimed is:

1. In a cable connecting system connecting a first device to a second device with a cable carrying binary information between the first device and the second device over a wire contained in the cable, a self-contained, dual-purpose cable connecting device for connecting the cable to a device and for monitoring and visually indicating activity on the wire comprising:
   a) series connection means for inserting a connecting wire in series with the wire in the cable;
   b) signal sampling and triggering means connected to said connecting wire for sensing any binary signals on said connecting wire and for producing a trigger output when a binary signal is sensed;
   c) an illuminatable visible indicator;
   d) monostable device means having said trigger output connected to a monostable input thereof and a monostable output connected to said indicator for producing a signal at said monostable output of sufficient duration to illuminate said indicator for a visibly detectable period of time; and,
   e) means for deriving required power from a wire carrying power from the first device to the second device; wherein
   f) said signal sampling and triggering means include a high impedance means connected in parallel to said connecting wire, said high impedance means including prebiased semiconductor components whereby said signal sampling and triggering means interfaces to said connecting wire with an impedance sufficiently high to preserve the integrity of said binary information being carried in the wire.

2. The dual-purpose cable connecting device for to a cable connecting system of claim 1 wherein:
   a) the cable includes a plurality of wires including one providing power from the first device to the second device; and,
   b) said series connection means includes means for inserting a connecting wire in series with each of the wires in the cable; and additionally comprising,
   c) power sampling means connected to the one of said connecting wires carrying power from the first device to the second device for providing power from said one of said connecting wires to said signal sampling and triggering means, said indicator, and said monostable device means.

3. Diagnostic monitoring apparatus for plug-in connection in-line with an end-connecting plug of a cable connecting first device to a the second device and carrying binary information over a wire contained in the cable, said apparatus comprising:
   a) series connection means for inserting a connecting wire in series with the wire in the cable;
   b) signal sampling and triggering means connected to said connecting wire for sensing any binary signals on said connecting wire and for producing a trigger output when a binary signal is sensed;
   c) an illuminatable visible indicator;
   d) monostable device means having said trigger output connected to a monostable input thereof and a monostable output connected to said indicator for producing a signal at said monostable output of sufficient duration to illuminate said indicator for a visibly detectable period of time; and,
   e) means for deriving required power from a wire carrying power from the first device to the second device; wherein
   f) said signal sampling and triggering means is a high impedance means connected in parallel to sid connecting wire, said high impedance means including prebiased semiconductor components whereby said signal sampling and triggering means interfaces to said connecting wire with an impedance sufficiently high to preserve the integrity of said binary information being carried in the wire.

4. The diagnostic monitoring apparatus of claim 3 wherein:
   a) the cable includes a plurality of wires including one providing power from the first device to the second device; and,
   b) said series connection means includes means for inserting a connecting wire in series with each of the wires in the cable; and additionally comprising,
   c) power sampling means connected to the one of said connecting wires carrying power from the first device to the second device for providing power from said one of said connecting wires to said signal sampling and triggering means, said indicator, and said monostable device means.

5. The diagnostic monitoring apparatus of claim 4 wherein:
   a) the cable is a cable in a contention type local area network and contains wires associated with transmit, receive, and collision activity data transmission; and additionally comprising,
   b) a plurality of said illuminatable visible indicators each comprising an LED and associated, respectively, with the transmit, receive, and collision functions;
   c) a plurality of said signal sampling and triggering means connected to respective ones of said connecting wire for sensing any binary signals on its associated said connecting wire and for producing a trigger output when a binary signal is sensed; and,
   d) a plurality of said monostable device means having respective ones of said trigger outputs connected to monostable inputs thereof and each having a monostable output connected to a respective one of said LEDs for producing a signal at said monostable output of sufficient duration to illuminate said LED for a visibly detectable period of time when a signal is detected on its associated said connecting wire.

* * * * *